US005933111A

United States Patent [19]

Schroeder et al.

[11] Patent Number: 5,933,111

[45] Date of Patent: Aug. 3, 1999

[54] APPARATUS AND METHOD FOR DETECTION OF ANTENNA MISPOINTING IN SATELLITE EARTH STATIONS

[75] Inventors: Robert Edward Schroeder, Township of Morris; Matthew J. Sherman, North Arlington, both of N.J.

[73] Assignee: A T & T Corp., New York, N.Y.

[21] Appl. No.: 08/877,674

[22] Filed: Jun. 17, 1997

[51] Int. Cl.$^6$ ................................ H01Q 3/00; H04B 1/60

[52] U.S. Cl. ................................................ 342/359; 455/10

[58] Field of Search ...................................... 342/359, 351, 342/358; 455/278.1, 10, 9

[56] References Cited

U.S. PATENT DOCUMENTS

| | | | |
|---|---|---|---|
| 4,785,302 | 11/1988 | Ma et al. | 342/358 |
| 4,888,596 | 12/1989 | Conanan | 343/703 |
| 4,977,615 | 12/1990 | Suzuki et al. | 455/278.1 |

*Primary Examiner*—Gregory C. Issing

[57] ABSTRACT

An apparatus and method for detecting an antenna mispointing condition of an earth station. A noise floor detector, coupled to a received radio communications link signal, measures a noise floor of a selected frequency band in which no radio signals are normally present. A controller, coupled to the noise detector, detects an antenna mispointing condition when a signal strength of the received radio communications link signal is less than a predetermined signal strength and a difference between the measured noise floor and a baseline noise floor measurement is less than a predetermined difference.

13 Claims, 2 Drawing Sheets

APPARATUS AND METHOD FOR DETECTION OF ANTENNA MISPOINTING IN SATELLITE EARTH STATIONS

BACKGROUND OF THE INVENTION

1. Field of the Invention

The present invention relates to the field of telecommunications. More particularly, the present invention relates to an apparatus and a method for detecting an antenna mispointing condition.

2. Description of the Related Art

Antennas used at satellite Earth Stations (ES) that provide Fixed Satellite Services (FSS) are aligned with high accuracy (±0.5 degree) to point at Geosynchronous Orbit (GSO) satellites located at a specific locations in the sky. Presently, there are three approaches that are used for detecting antenna mispointing conditions. First, ES performance is actively monitored using trained technicians. Second, a steerable ES antenna is used that is controlled using well-known closed-loop techniques for optimizing link performance. Third, downlinked FSS signals are monitored for confirming reception of known network messages and the network responses to transmissions from the ES.

The present approaches for detecting antenna mispointing conditions are satisfactory for current frequency bands of operation and for limited numbers of earth stations. However, newer FSS networks will provide ubiquitous services by using large numbers of unsupervised earth stations. Since the unsupervised earth stations are contemplated to be inexpensive consumer-type electronics, actively-controlled (steerable) antennas are generally not being considered. Consequently, the first and second antenna mispointing detection approaches are not practical. The third approach currently used is the only approach that would be applicable for detecting antenna mispointing conditions for the unsupervised earth stations.

Many of the new FSS networks that will use the inexpensive earth stations will operate in new frequency bands in which considerable weather impairments potentially exist, such as signal attenuation caused by rain and other adverse atmospheric conditions. To counter the weather-related impairments, the unsupervised earth stations will employ open- and closed-loop power control features. That is, ES transmissions will be monitored by the network. When the signal strength of transmissions from an ES are weakened by an adverse atmospheric condition, the network will issue a command to the ES for an increase in transmit power using open-loop techniques at the ES. When transmissions are so weak that link error rate(s) increase or no network acknowledgements are received by an ES, the ES and/or satellite will continue to gradually increase transmit power until the link errors are reduced or acknowledgements are received and closed-loop power control techniques can be performed. If, at the highest permissible ES transmit power level, the network still does not respond with an acknowledgement, the ES determines that there is an error condition and transmissions will cease.

FIG. 1 shows a schematic block diagram of a conventional RF antenna subsystem 10 for an earth station. A demodulator 11 demodulates received RF signals in a well-known manner to produce a data-in signal. An earth station system controller 12 is coupled to demodulator 11 by a power monitor signal that is output from demodulator 11. A demodulator control signal that is output from controller 12 is coupled to demodulator 11. Subsystem 10 also includes a modulator 13 that modulates data for RF transmission in a well-known manner. Modulator 13 is coupled to controller 12 through a modulation control signal that is output from controller 12. The output of modulator 13 passes through a gain control device 14 before being coupled to an antenna (not shown). Gain control device 14 operates in a well-known manner and is controlled by a Tx level control signal that is output from controller 12.

FIG. 2 shows a flow diagram of a conventional process 20 for establishing satellite communications links for the conventional earth station antenna subsystem 10 that is shown in FIG. 1. If, at step 21, no downlink signal is detected, then an error condition is indicated in a well-known manner by the subsystem at step 22. Otherwise, open-loop power control is performed for optimizing the transmit power required for completing the radio communications path between the earth station and another radio communications device. At step 23, a service request is transmitted by the earth station. At step 24, controller 12 determines whether the network has responded to the service request. If not, flow continues to step 25 where controller 12 controls gain control device 14 to increase the output transmit power of the earth station. At step 26, it is determined whether the maximum transmit power has been exceeded. If so, flow continues to step 27 where an error is indicated in a well-known manner by the subsystem because the network has not responded and the maximum transmit power has been exceeded. If the maximum transmit power has not been exceeded, flow continues back to step 24. When a network response is detected before the maximum transmit power is exceeded, flow continues to step 28 where well-known closed-loop power control and synchronization processes are performed by the subsystem.

A problem associated with this conventional approach for detecting antenna mispointing conditions is that in some frequency bands, the acceptable attenuation from weather impairments exceeds the acceptable attenuation caused by antenna mispointing. Consequently, it is possible for a mispointed ES antenna to remain operational in clear atmospheric conditions. That is, the FSS network would simply treat signal attenuation caused by antenna mispointing as a weather impairment and issue commands to the ES for increasing the ES transmit power above the nominal link budget. However, a mispointed ES antenna can potentially cause interference levels to be increased at an adjacent satellite since the mispointed ES will be operating at a large transmission power margin that would normally occur only in adverse atmospheric conditions.

Therefore, there is an need for reliably differentiating between received signal impairments caused by adverse atmospheric conditions and by antenna mispointing so that appropriate countermeasures can be performed. For example, power control can be used for weather-related impairments while an operator error signal can be used for indicating a mispointed antenna.

SUMMARY OF THE INVENTION

The present invention reliably differentiates between received signal impairments caused by adverse atmospheric conditions and by antenna mispointing so that appropriate countermeasures can be performed. The advantages of the present invention are provided by an apparatus and method for detecting an antenna mispointing condition of an earth station. According to the invention, a noise floor detector, coupled to a received radio communications link signal, measures a noise floor of a selected frequency band in which no radio signals are normally present. A controller, coupled to the noise detector, detects an antenna mispointing condition when a signal strength of the received radio communications link signal is less than a predetermined signal strength and a difference between the measured noise floor and a baseline noise floor measurement is less than a predetermined difference. Preferably, the controller includes a memory in which the baseline noise floor measurement is stored. When an antenna mispointing condition is detected, the controller provides an antenna mispointing condition indication. The controller detects an adverse atmospheric condition when the signal strength of the received radio communications link signal is less than the predetermined signal strength and the difference between the measured noise floor and the baseline noise floor measurement is greater than or equal to the predetermined difference. When the controller detects an adverse atmospheric condition, the controller increases the gain of the transmission gain control device and provides an adverse atmospheric condition indication.

BRIEF DESCRIPTION OF THE DRAWING

The present invention is illustrated by way of example and not limitation in the accompanying figures in which like reference numerals indicate similar elements and in which.

DETAILED DESCRIPTION

Figure 1:
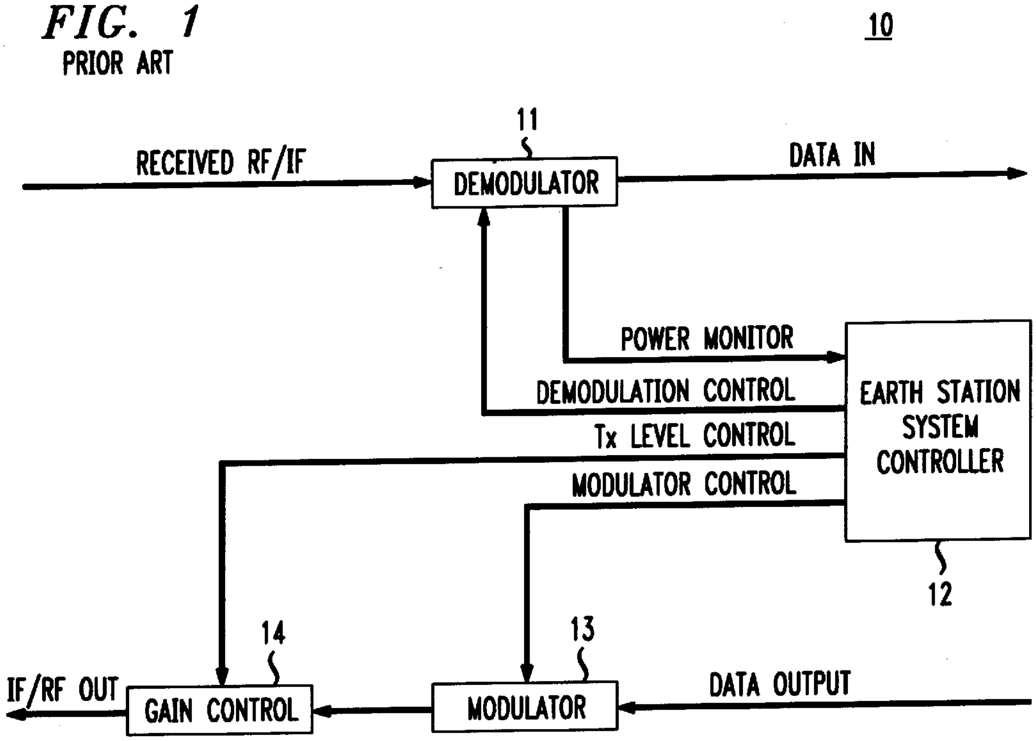
FIG. 1 PRIOR ART
FIG. 1 shows a schematic block diagram of a conventional earth station antenna subsystem.
Figure 2:
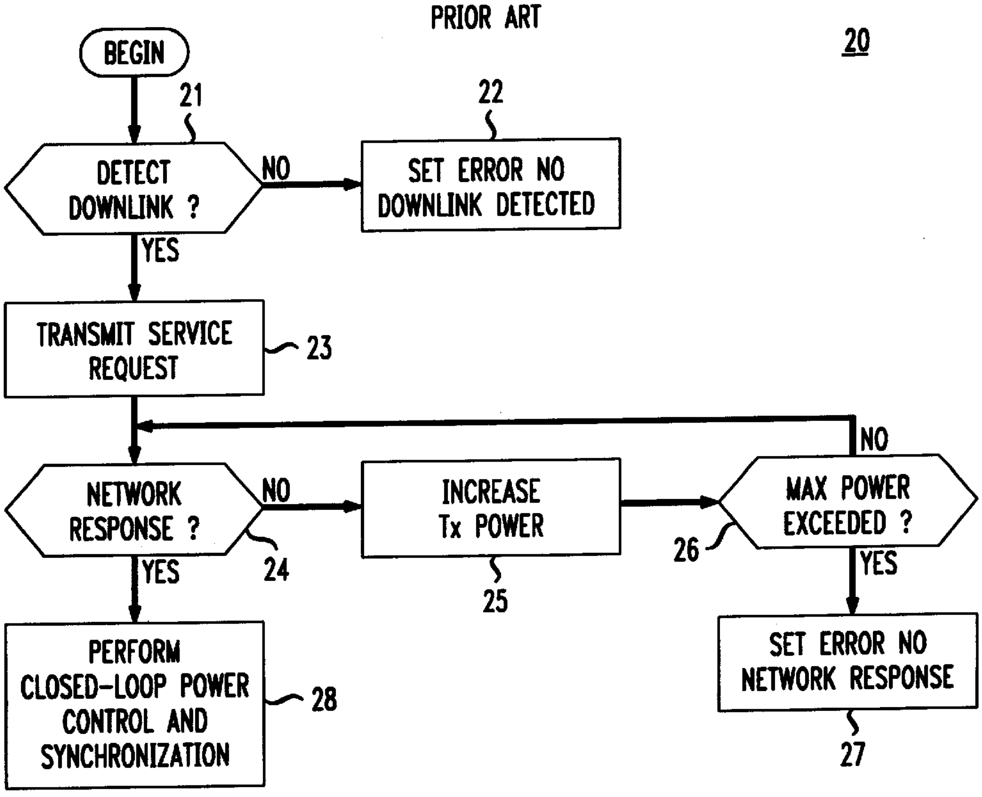
FIG. 2 PRIOR ART
FIG. 2 shows a flow diagram of a conventional process for establishing satellite communications links for the convention earth station antenna subsystem of FIG. 1.

The present invention provides a method and apparatus for accurately and reliably distinguishing between attenuation of a received signal caused by an antenna mispointing condition and attenuation caused by a weather impairment. Thus, the present invention helps eliminate an improper operational condition of an earth station in which the earth station increases transmit power of an antenna subsystem with the intention of compensating for an incorrectly determined adverse atmospheric condition when, in reality, the earth station antenna is mispointed. Additionally, the present invention provides a more practical solution than manual monitoring a complex, expensive closed-loop pointing control subsystem for detecting an antenna mispointing condition of an earth station.

To distinguish between a loss of signal strength caused by mispointing of an antenna, and loss of signal strength caused by a weather impairment, such as rain, a noise detector measures a baseline system noise floor and a baseline received signal strength when the earth station system is initialized. Atmospheric conditions, such as rain, is relatively warm compared to space, which is cold. Therefore, when an antenna is mispointed, but still pointed unobstructedly into space, no change should be measured in the noise floor of the system in comparison to the baseline system noise floor measurement because the noise power per unit bandwidth measured by an antenna mispointed into space should equal the baseline system noise floor. If, however, a radio communications link passes through rain or an adverse weather or atmospheric condition that causes substantial signal loss, then the noise floor of the system will rise based on the relative warmth of the weather (and air) compared to that of space because the noise power per unit bandwidth of the rain or adverse atmospheric condition will be greater than the noise power per unit bandwidth of space. Thus, more noise is received by the antenna during a rain storm and, consequently, an increase in the overall system noise floor can be measured and used for control. When signal attenuation is detected by the antenna subsystem after the baseline measurement, the noise detector is controlled to make a system noise floor measurement that is compared to the baseline measurement. The antenna subsystem initiates an appropriate system response depending on whether the noise floor remains constant or significant increases from the baseline system noise measurement.

When an earth station is first set up and calibrated, the orientation, or point, of the antenna dish can be manually optimized for the maximum signal strength. Preferably, the calibration operation is performed in clear weather, at which time the ES performs a noise floor calibration measurement in a selected frequency band where no signal is normally present. The noise floor measurement, a received downlink signal strength, and the transmit power level required for closing the uplink are permanently stored by the ES as baseline measurements used for determining an antenna mispointing condition. During normal operation, the ES establishes a radio communication link and measures the received power level detected on the downlink. If the level is highly attenuated, the ES then checks the system noise floor. If the measured noise floor is elevated, the ES controller concludes that an adverse weather event is causing the reduced signal strength of the received signal, and the transmit power will be increased to close the link. If the measured noise floor is not elevated, that is, the measured noise floor does not exceed a predetermined difference from the baseline system noise floor, the ES concludes that the antenna has become mispointed and an error condition requiring antenna repainting is indicated. Uplink transmissions are disabled so that the possibility of an increased interference level at another receiving radio communications device caused by a mispointing error being mistaken interpreted as an adverse atmospheric condition is avoided.

Figure 3:
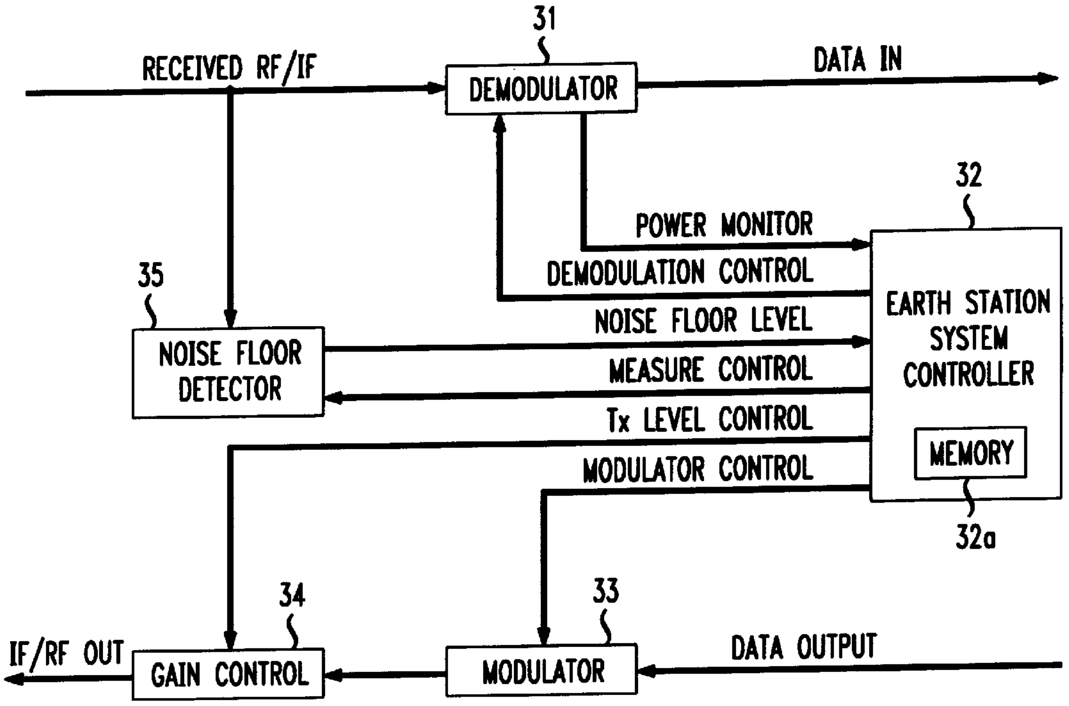
FIG. 3 shows a schematic block diagram of an earth station antenna subsystem according to the present invention.

FIG. 3 shows a schematic block diagram of an earth station antenna subsystem 30 according to the present invention. A demodulator 31 demodulates received RF signals in a well-known manner for producing a data-in signal. An earth station system controller 32 is coupled to demodulator 31 by a power monitor signal that is output from demodulator 31. A demodulator control signal output that is from controller 32 is coupled to demodulator 31. Subsystem 30 includes a modulator 33 that modulates data for RF transmission in a well-known manner. Modulator 33 is coupled to controller 32 through a modulation control signal that is output from controller 32. The output of modulator 33 passes through a gain control device 34 before being coupled to an antenna (not shown). Gain control device 34 operates in a well-known manner and is controlled by a Tx level control signal that is output from controller 32. Antenna subsystem 30 also includes a noise floor detector 35 coupled to the received RF signal. Noise floor detector 35 measures the noise floor, or noise power per unit bandwidth, in a well-known manner for a radio communications link established between the antenna and another radio communications device, such as a satellite. The output of noise floor detector 35 is coupled to controller 32.

During system setup, the system noise floor is calibrated by noise floor detector 35 measuring a baseline noise floor of a selected frequency band in which no radio signals are normally present. A received signal strength is measured in a frequency band in which a signal is normally present, along with the transmit power required for completing the radio communications path as additional baseline measurements. Preferably, the earth station is optimized at the time of system setup for the maximum baseline received signal strength. The baseline measurements are stored in a memory 32*a* of controller 32.

Figure 4:
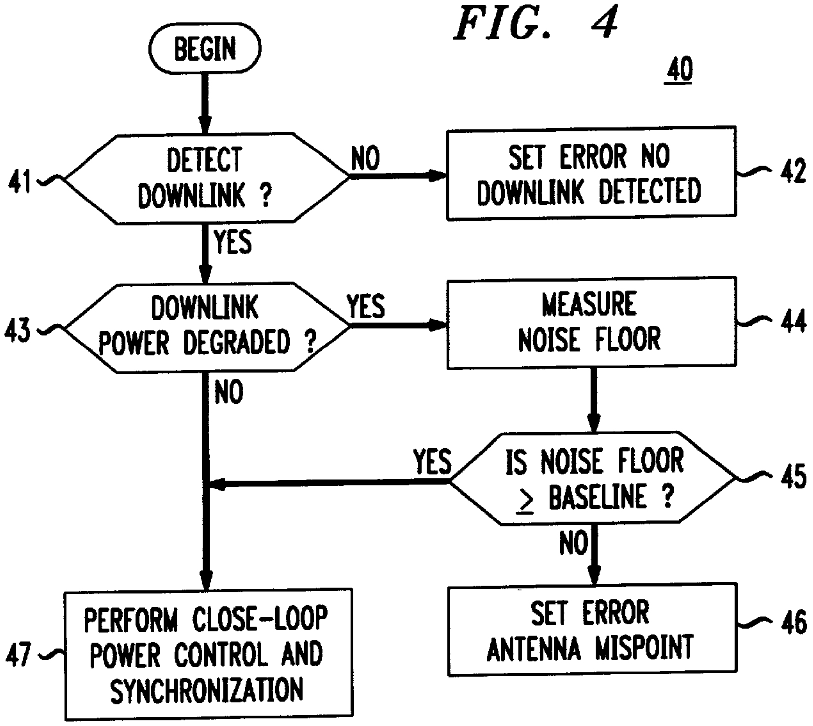
FIG. 4 shows a flow diagram process for establishing satellite communications links for the earth station antenna subsystem according to the present invention.

FIG. 4 shows a flow diagram process 40 for establishing satellite radio communications links for earth station antenna subsystem 30 according to the present invention. The received signal strength is continually monitored at step 41 by controller 32 during system operation. If no downlink is detected, flow continues to step 42 where an error is indicated in a well-known manner by the subsystem. Otherwise, flow continues to step 42 where it is determined whether the downlink power has been degraded by comparing a current received signal strength measurement to the baseline signal strength measurement stored in memory 32*a*. When the received signal strength falls below a predetermined threshold, or is a predetermined level below the baseline measurement, flow continues to step 44 where controller 32 controls noise floor detector 35 to make a current measurement of the system noise floor of the selected frequency band in which no radio signals are normally present. At step 45, the current noise floor measurement is compared with the baseline measurement stored in memory 32*a* for determining whether an adverse atmospheric condition or an antenna mispointing condition is being experienced. If the difference between the current measurement and the baseline measurement is greater than a predetermined amount, then flow continues to step 47 where open-loop power control is initiated for closing the radio communications path. If the difference between the current measurement and the baseline measurement is less than a predetermined amount, flow continues to step 46 where an antenna pointing error is indicated in a well-known manner to the system and transmissions are disabled.

Alternatively, the triggering event for initiating a noise floor measurement can be based on a relative magnitude of the transmit power required for closing the uplink. That is, when the magnitude of the transmit power required for closing the uplink exceeds a predetermined transmit power level, a noise floor measurement and comparison is initiated. Preferably, controller 32 includes a manual override mode in which transmissions are enable for performing any necessary diagnostic or emergency procedures.

While the present invention has been described in connection with the illustrated embodiments, it will be appreciated and understood that modifications may be made without departing from the true spirit and scope of the invention.

What is claimed is:

1. An apparatus for detecting an antenna mispointing condition of an earth station, the apparatus comprising:

a noise floor detector, coupled to a received radio communications link signal, the noise floor detector measuring a noise floor of a selected frequency band; and a controller, coupled to the noise detector, detecting an antenna mispointing condition when a signal strength of the received radio communications link signal is less than a predetermined signal strength and a difference between the measured noise floor and a baseline noise floor measurement is less than a predetermined difference, the baseline noise floor measurement being a reference noise floor measurement.

2. The apparatus according to claim 1, wherein the controller controls the noise floor detector to measure the baseline noise floor measurement in the selected frequency band in which no radio signals are normally present.

3. The apparatus according to claim 2, wherein the controller includes a memory storing the baseline noise floor measurement.

4. The apparatus according to claim 3, wherein the controller provides an antenna mispointing condition indication, the antenna mispointing condition occurring when the signal strength of the received radio communications link signal is less than the predetermined signal strength and the difference between the measured noise floor and the baseline noise floor measurement is less than the predetermined difference.

5. The apparatus according to claim 4, wherein the controller detects an adverse atmospheric condition, the adverse atmospheric condition occurring when the signal strength of the received radio communications link signal is less than the predetermined signal strength and the difference between the measured noise floor and the baseline noise floor measurement is greater than or equal to the predetermined difference.

6. The apparatus according to claim 5, further comprising a transmission gain control device coupled to the controller, the controller increasing a gain of the transmission gain control device when the controller detects an adverse atmospheric condition.

7. The apparatus according to claim 6, wherein the controller provides an adverse atmospheric condition indication when the controller detects an adverse atmospheric condition.

8. A method for detecting an antenna mispointing condition, the method comprising the steps of:

measuring a baseline noise floor of a selected frequency band at initial setup of an earth station;

detecting a signal strength of a received radio communications link signal;

measuring a noise floor of the selected frequency band when the detected signal strength of the received radio communications link signal is less than a predetermined signal strength; and determining an antenna mispointing condition of the earth station when a difference between the measured noise floor and the baseline noise floor measurement is less than a predetermined difference.

9. The method according to claim 8, further comprising the step of storing the baseline noise floor measurement.

10. The method according to claim 9, further comprising the step of providing an antenna mispointing condition indication when the signal strength of the received radio communications link signal is less than the predetermined signal strength and the difference between the measured noise floor and the baseline noise floor measurement is less than the predetermined difference.

11. The method according to claim 10, further comprising the step of detecting an adverse atmospheric condition when the signal strength of the received radio communications link signal is less than the predetermined signal strength and the difference between the measured noise floor and the baseline noise floor measurement is greater than or equal to the predetermined difference.

12. The method according to claim 11, further comprising the step of increasing a gain of a transmission gain control device when an adverse atmospheric condition is detected.

13. The method according to claim 12, further comprising the step of providing an adverse atmospheric condition indication when an adverse atmospheric condition is detected.

* * * * *